US012736682B2

(12) United States Patent
Bogatscher

(10) Patent No.: US 12,736,682 B2
(45) Date of Patent: Sep. 15, 2026

(54) SYSTEMS AND METHODS FOR BLIND ZONE VISUALIZATION AND ONLINE VISUALIZATION SENSOR CALIBRATION

(71) Applicant: Torc Robotics, Inc., Blacksburg, VA (US)

(72) Inventor: Siegwart Bogatscher, Leonberg (DE)

(73) Assignee: TORC Robotics, Inc., Blacksburg, VA (US)

( * ) Notice: Subject to any disclaimer, the term of this patent is extended or adjusted under 35 U.S.C. 154(b) by 117 days.

(21) Appl. No.: 18/826,645

(22) Filed: Sep. 6, 2024

(65) Prior Publication Data

US 2026/0072175 A1 Mar. 12, 2026

(51) Int. Cl.

| | |
|---|---|
| ***G01S 17/931*** | (2020.01) |
| ***B60W 60/00*** | (2020.01) |
| ***G01S 7/481*** | (2006.01) |
| ***G01S 7/497*** | (2006.01) |
| ***G01S 17/86*** | (2020.01) |
| ***G01S 17/89*** | (2020.01) |
| ***G06T 7/80*** | (2017.01) |
| ***G06V 20/58*** | (2022.01) |

(52) U.S. Cl.

CPC ......... *G01S 17/931* (2020.01); *B60W 60/001* (2020.02); *G01S 7/4817* (2013.01); *G01S 7/497* (2013.01); *G01S 17/86* (2020.01); *G01S 17/89* (2013.01); *G06T 7/80* (2017.01); *G06V 20/58* (2022.01); *B60W 2420/403* (2013.01); *B60W 2420/408* (2024.01); *G06T 2207/10028* (2013.01); *G06T 2207/30261* (2013.01)

(58) Field of Classification Search

CPC ...... G01S 17/931; G01S 7/4817; G01S 7/497; G01S 17/86; G01S 17/89; B60W 60/001; B60W 2420/403; B60W 2420/408; G06T 7/80; G06T 2207/10028; G06T 2207/30261; G06V 20/58

See application file for complete search history.

(56) References Cited

U.S. PATENT DOCUMENTS

| | | | | |
|---|---|---|---|---|
| 10,564,261 | B2 | 2/2020 | Huebner et al. | |
| 10,677,925 | B2 | 6/2020 | Boehmke | |
| 11,341,684 | B1 * | 5/2022 | Robinson .............. | B60W 50/00 |

(Continued)

FOREIGN PATENT DOCUMENTS

JP 2022163298 A * 10/2022

*Primary Examiner* — Hunter B Lonsberry
*Assistant Examiner* — Harrison Heflin
(74) *Attorney, Agent, or Firm* — Armstrong Teasdale LLP

(57) ABSTRACT

A blind zone visualization system for an autonomous vehicle is described. The system includes at least one visual sensor mounted on a roof of the autonomous vehicle and at least one mirror mounted on a hood of the autonomous vehicle. The at least one mirror redirects a portion of a field of view (FOV) of the at least one sensor into a volume of space in front of the autonomous vehicle. The system also includes at least one processor programmed to execute computer-readable instructions that cause the at least one processor to receive sensor data output from the at least one visual sensor and representative of the volume of space, detect, from the sensor data, no obstacle is present in the volume of space, and transmit a first signal to a control system of the autonomous vehicle to control the autonomous vehicle to travel forward through the volume of space.

19 Claims, 13 Drawing Sheets

(56) References Cited

U.S. PATENT DOCUMENTS

| | | | | |
|---|---|---|---|---|
| 11,391,820 | B2 | 7/2022 | Chen et al. | |
| 11,474,211 | B2 | 10/2022 | Karplus et al. | |
| 11,634,079 | B2 | 4/2023 | Ning et al. | |
| 2018/0032822 | A1 | 2/2018 | Frank et al. | |
| 2020/0341118 | A1* | 10/2020 | Chen | G05D 1/0088 |
| 2022/0144185 | A1 | 5/2022 | Burnette et al. | |
| 2022/0242319 | A1 | 8/2022 | James | |
| 2023/0010027 | A1* | 1/2023 | Fujii | G01S 17/931 |
| 2025/0093516 | A1* | 3/2025 | Al-Ejel | G01S 7/497 |

* cited by examiner

SYSTEMS AND METHODS FOR BLIND ZONE VISUALIZATION AND ONLINE VISUALIZATION SENSOR CALIBRATION

TECHNICAL FIELD

The field of the disclosure relates generally to blind zone visualization and, more specifically, using mirrors to visualize a blind zone of a stationary autonomous vehicle and online visualization sensor calibration.

BACKGROUND OF THE INVENTION

Autonomous vehicles employ technologies such as perception, localization, behaviors and planning, and control. In particular, perception technologies enable an autonomous vehicle to sense its environment and process the sensed environment to detect, identify, and classify objects, or groups of objects, in the environment (e.g., pedestrians, vehicles, or debris).

This object detection is essential to the functionality of automatous vehicles, to ensure the safety of persons in the environment of the autonomous vehicle. Therefore, these vehicles are equipped with numerous sensors. Notably, each sensor is capable of detection within a limited field of view (FOV). At least some automated vehicles experience one or more blind zones, which represent places or volumes in the vehicle's environment that are outside of sensors' FOV. One particular blind zone may include a volume directly in front of the vehicle, referred to as a front blind zone, in which structural parts of the vehicle (e.g., the hood) may obstruct or occlude the detection capabilities of certain object sensors, such as roof-mounted sensors.

While an autonomous vehicle is in-motion, obstacles in front of the vehicle or approaching the front of the vehicle from the side are detected under normal operation, because they enter the FOV of one or more detection sensors before entering any front blind zone. However, when an autonomous vehicle is not in motion or is at a standstill, an object in the front blind zone may be difficult to detect. Accordingly, there is a need for improvement in detection sensors to expand the operable FOV at standstill, to reduce or eliminate the front blind zone.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed blind zone visualization system for an autonomous vehicle includes at least one visual sensor mounted on a roof of the autonomous vehicle and at least one mirror mounted on a hood of the autonomous vehicle. The at least one mirror is configured to redirect a portion of a field of view (FOV) of the at least one sensor into a volume of space in front of the autonomous vehicle. The system also includes at least one processor programmed to execute computer-readable instructions that cause the at least one processor to: (i) receive sensor data output from the at least one visual sensor and representative of the volume of space; (ii) detect, from the sensor data, no obstacle is present in the volume of space; and (iii) transmit a first signal to a control system of the autonomous vehicle to control the autonomous vehicle to travel forward through the volume of space.

In another aspect, the disclosed autonomous vehicle includes a control system; and a blind zone visualization system. The system includes at least one visual sensor mounted on a roof of the autonomous vehicle and at least one mirror mounted on a hood of the autonomous vehicle. The at least one mirror is configured to redirect a portion of a field of view (FOV) of the at least one sensor into a volume of space in front of the autonomous vehicle. The system also includes at least one processor programmed to execute computer-readable instructions that cause the at least one processor to: (i) receive sensor data output from the at least one visual sensor and representative of the volume of space; (ii) detect, from the sensor data, no obstacle is present in the volume of space; and (iii) transmit a first signal to the control system to control the autonomous vehicle to travel forward through the volume of space.

In yet another aspect, the disclosed method of blind zone visualization for an autonomous vehicle is implemented using a visualization system. The system includes at least one visual sensor mounted of a roof of the autonomous vehicle, and at least one mirror mounted on a hood of the autonomous vehicle, the at least one mirror configured to redirect a portion of a field of view (FOV) of the at least one sensor into a volume of space in front of the autonomous vehicle. The system also includes least one processor programmed to execute computer-readable instructions. The method includes receiving sensor data output from the at least one visual sensor and representative of the volume of space, detecting, from the sensor data, no obstacle is present in the volume of space, and transmitting a first signal to a control system of the autonomous vehicle to control the autonomous vehicle to travel forward through the volume of space.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
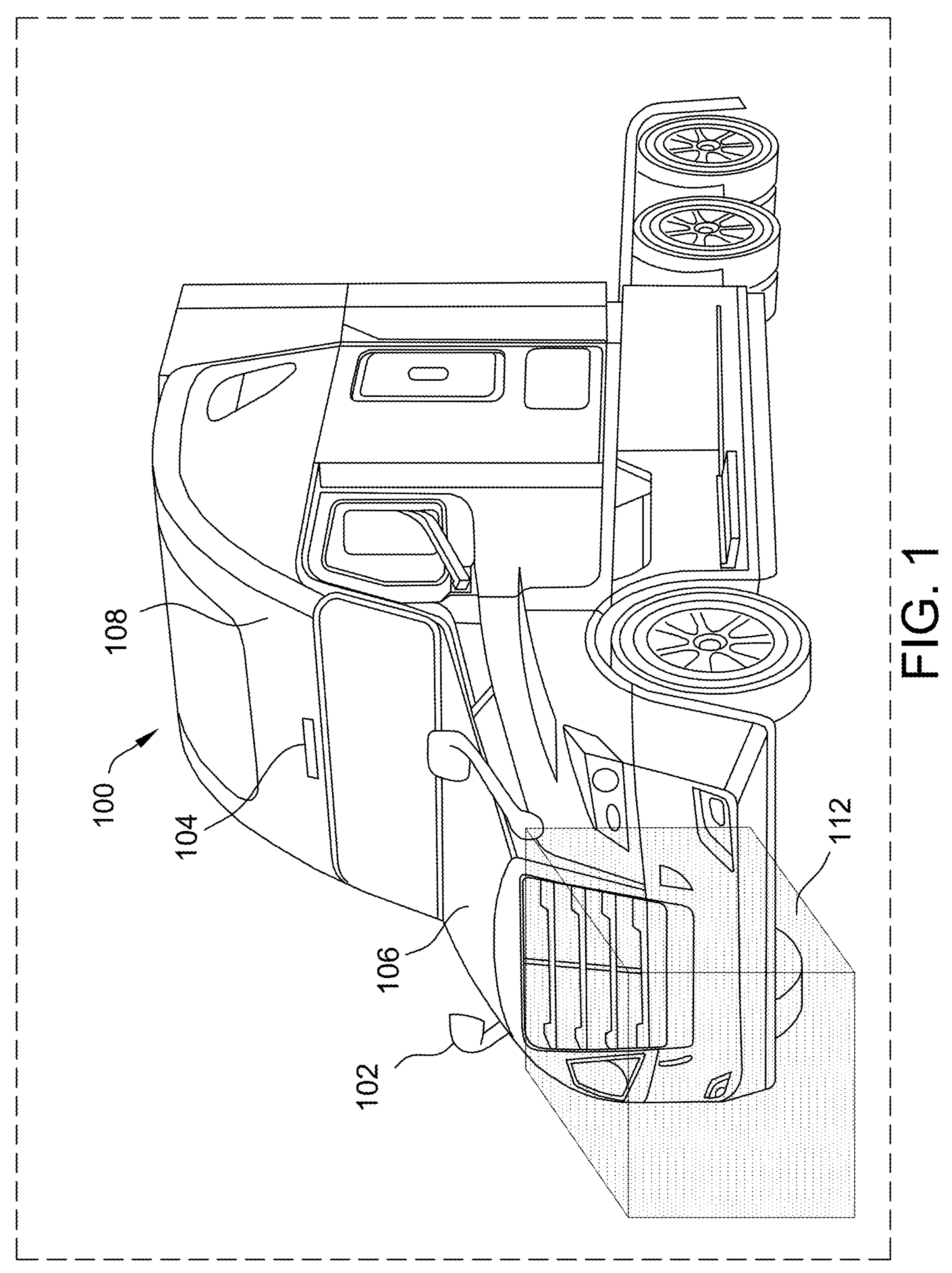
FIG. 1 is a schematic diagram of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing. The drawings are not to scale unless otherwise noted.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The disclosed systems and methods are described, for clarity, using certain terminology when referring to and describing relevant components within the disclosure. Where possible, common industry terminology is employed in a manner consistent with its accepted meaning. Unless otherwise stated, such terminology should be given a broad interpretation consistent with the context of the present application and the scope of the appended claims.

As described herein, certain autonomous vehicles experience a front blind zone, which is an area or volume in front of the vehicle that is not within a field of view (FOV) of the vehicle's object detection sensors. For example, the volume may be occluded by structural aspects of the vehicle, such as the vehicle's hood. When a vehicle is at a standstill or operating at very low speeds, an object within this front blind zone may therefore not be detected by the vehicle's perception system. At least some autonomous vehicles require this blind zone to be "cleared", or verified as empty or unobstructed, before the vehicle is controlled to travel forward.

Some known solutions for reducing this front blind zone may include the integration of additional detection sensors at the front of the autonomous vehicle. For example, visual detection sensors may be integrated into or installed on the front bumper or grille of the vehicle. However, these sensors are vulnerable to being damaged or obstructed by dirt, stones, and other road debris. This disadvantage increases as the sensor is lowered toward the ground. Moreover, the lower the sensor, the more likely the sensor's FOV will be occluded by road topography. Even further, in at least some cases, the front blind zone still exists, particularly in a horizontal dimension that is limited by a visual sensor's FOV. These additional sensors also represent additional cost and power consumption for the autonomous vehicle. Ultrasonic sensors, which may not have the same disadvantages of visual detections sensors, are not suitable for installation and use on vehicles, because their operation suffers when the sensors are exposed to significant vibration.

The present disclosure addresses the above-described problems in known systems and methods. Systems and methods described herein provide reduction or elimination of the front blind zone of a stationary autonomous vehicle, or an autonomous vehicle operating at low speeds, by expanding the FOV of existing vehicle visual sensors, using a visualization system that includes one or more mirrors and one or more visual sensors. In particular, the mirror(s) redirect at least a portion of one or more roof-mounted visual sensors' FOV into the volume in front of the vehicle, and sensor output from the visual sensor(s) is processed to confirm no obstacles are in that space.

In at least some instances, automated vehicles are provided with hood-mounted mirrors. It is contemplated that these mirrors may be specifically designed to augment the FOV of one or more visual sensors to reduce or eliminate the front blind zone. The selected parameters of the mirrors of the present disclosure may include the angle/orientation, shape (e.g., curvature), and/or location of the mirror(s). In some instances, one or more additional or alternative mirrors are provided. In the example embodiment, modifying or selecting the particular parameters of the static mirrors increases the angular coverage of the sensors'FOV.

The mirror(s) modify the FOV of one or more roof-mounted visual sensors, including one or more LiDAR sensors, one or more cameras, or a combination thereof, although other visual sensors may be additionally or alternatively included. Modifying the FOV of a camera enables capturing more or higher-resolution visual inputs from the volume in front of the vehicle. Modifying the FOV of a LiDAR sensor enables capturing dimensional information from the volume in front of the vehicle (e.g., angular information, distance, orientation, etc.). In certain embodiments where both camera(s) and LiDAR sensor(s) are used, the resulting visual inputs may therefore have a higher resolution and increased dimensional information. Moreover, such a sensor combination provides dual-modality sensing, which increases the level of sensing redundancy in the volume in front of the vehicle before the autonomous vehicle starts moving from a standstill, enhancing safety and reliability.

The present disclosure provides significant advantages over at least some known systems. For instance, the system described herein does not require the installation of new or additional sensors but rather relies on visual sensors that are already existing on autonomous vehicles. Therefore, there is little to no additional cost nor power consumption related to the introduction of new sensors. Employing roof-mounted visual sensors avoids occlusion by road topography and significantly reduces impacts and damage from dirt, stone, and other road debris. Additionally, the modified FOV of the visual sensors improves visualization of the volume in front the vehicle compared to grille-mounted sensors, because the roof-mounted perspective facilitates detection of flatter objects, objects closer to the vehicle, and objects lower to the ground.

When active, this visualization system enables reduction or elimination of the front blind zone. In the example embodiment, the inputs from the visual sensor(s) having the modified FOV are employed in limited situations, specifically, when the autonomous vehicle is stationary, at a temporary standstill, or operating at very low speeds (e.g., in "stop-and-go" traffic situations). In these conditions, the visualization system is activated, and the various perception and control systems of the autonomous vehicle employ the sensor inputs to confirm there are no obstacles detected in the volume in front of the vehicle, before the vehicle is controlled to travel forward into that space. Under other conditions, the visualization system may be deactivated, thereby minimizing consumption of power and computing resources.

It should be understood that although the embodiments described herein relate to a volume of space in front of an autonomous vehicle, or a "front blind zone," the disclosure is equally applicable to blind zone(s) or volume(s) of space behind the autonomous vehicle or along the side(s) of the autonomous vehicle, or in any location adjoining the autonomous vehicle (and, therefore, outside of a field of view of a conventional image sensor). Various sensors and mirrors, as described herein, may be positioned in other locations to accommodate visualization of space(s) behind or alongside the autonomous vehicle. Moreover, use of the phrase "blind zone" herein should be understood to refer to such a volume of space, even where the implementation of the present disclosure reduces or eliminates the "blindness" of the visualization or autonomy system with respect to that volume of space.

Figure 2:
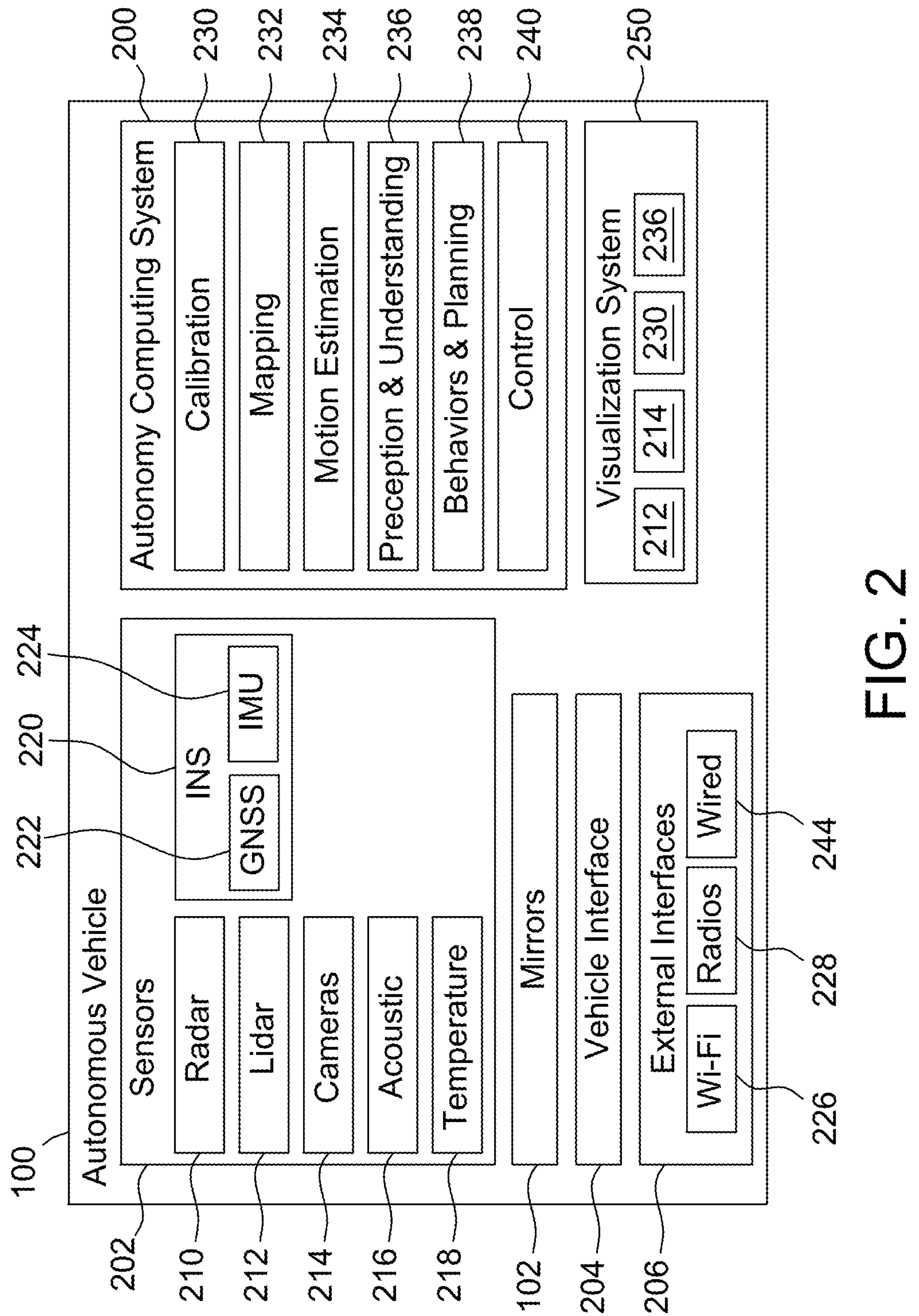
FIG. 2 is a block diagram of an autonomous vehicle.
Figure 7:
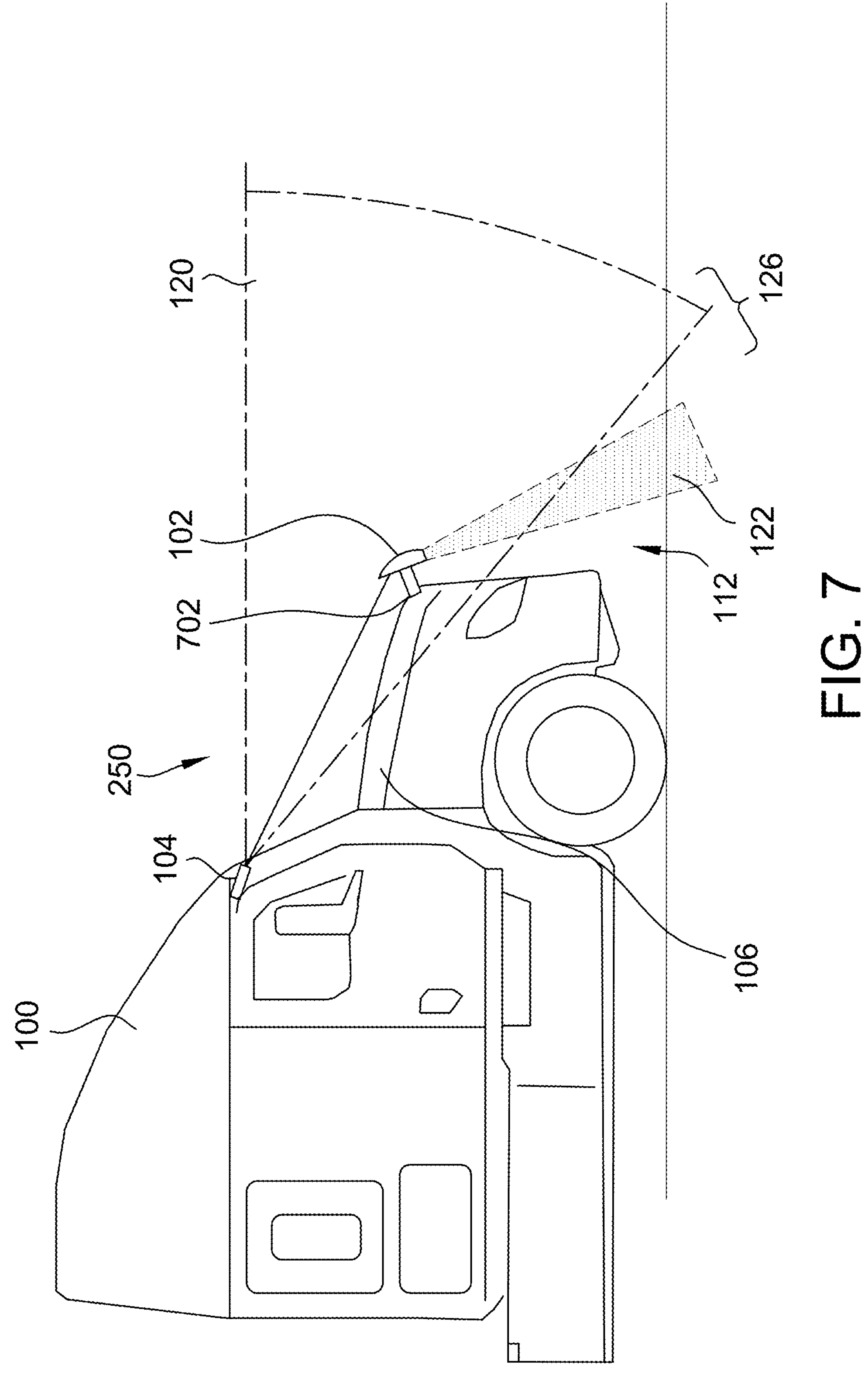
FIG. 7 is a schematic front view of an autonomous vehicle including another example embodiment of a blind zone visualization system.
Figure 8:
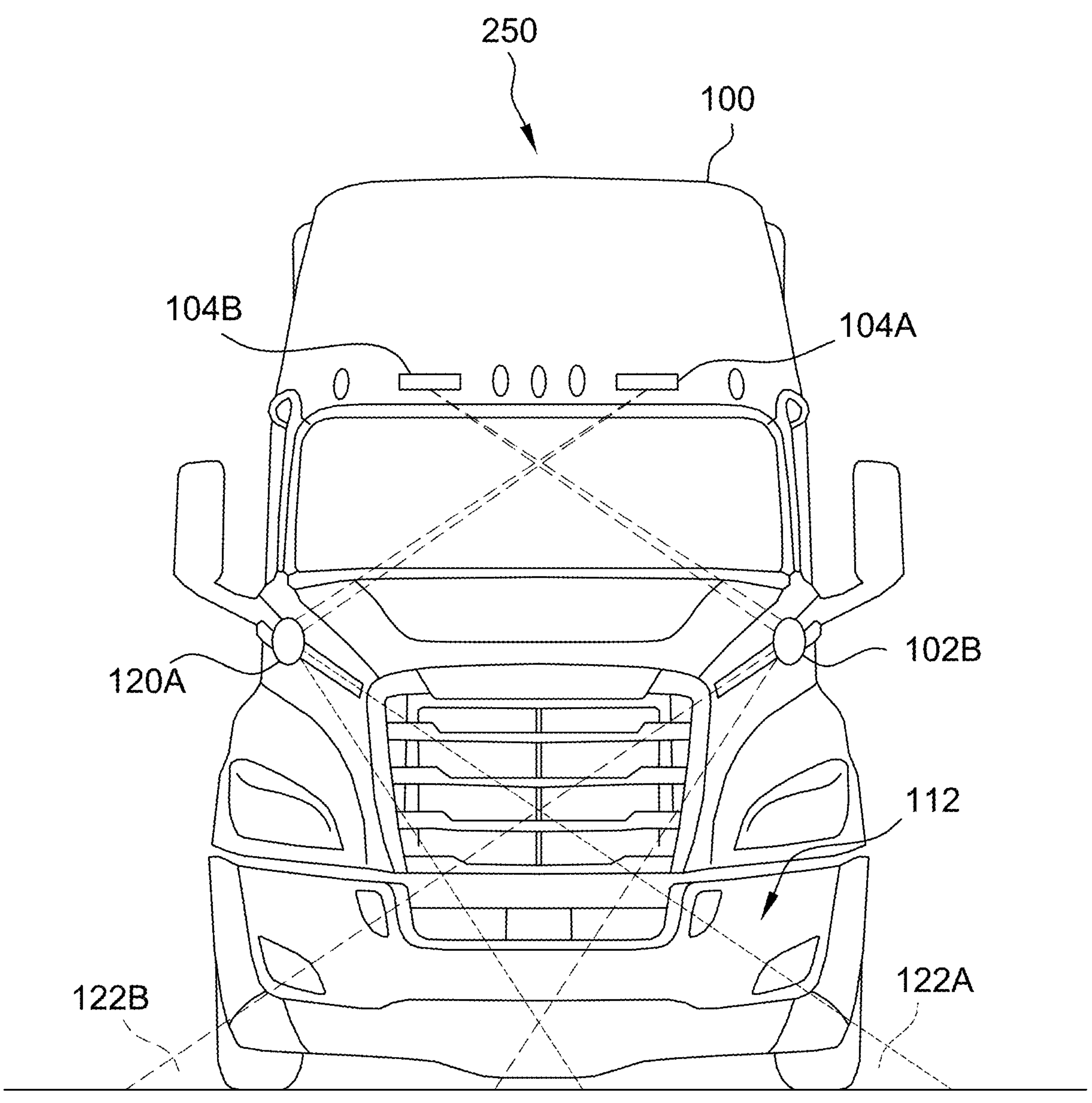
FIG. 8 is a schematic front view of an autonomous vehicle including a further example embodiment of a blind zone visualization system.
Figure 9:
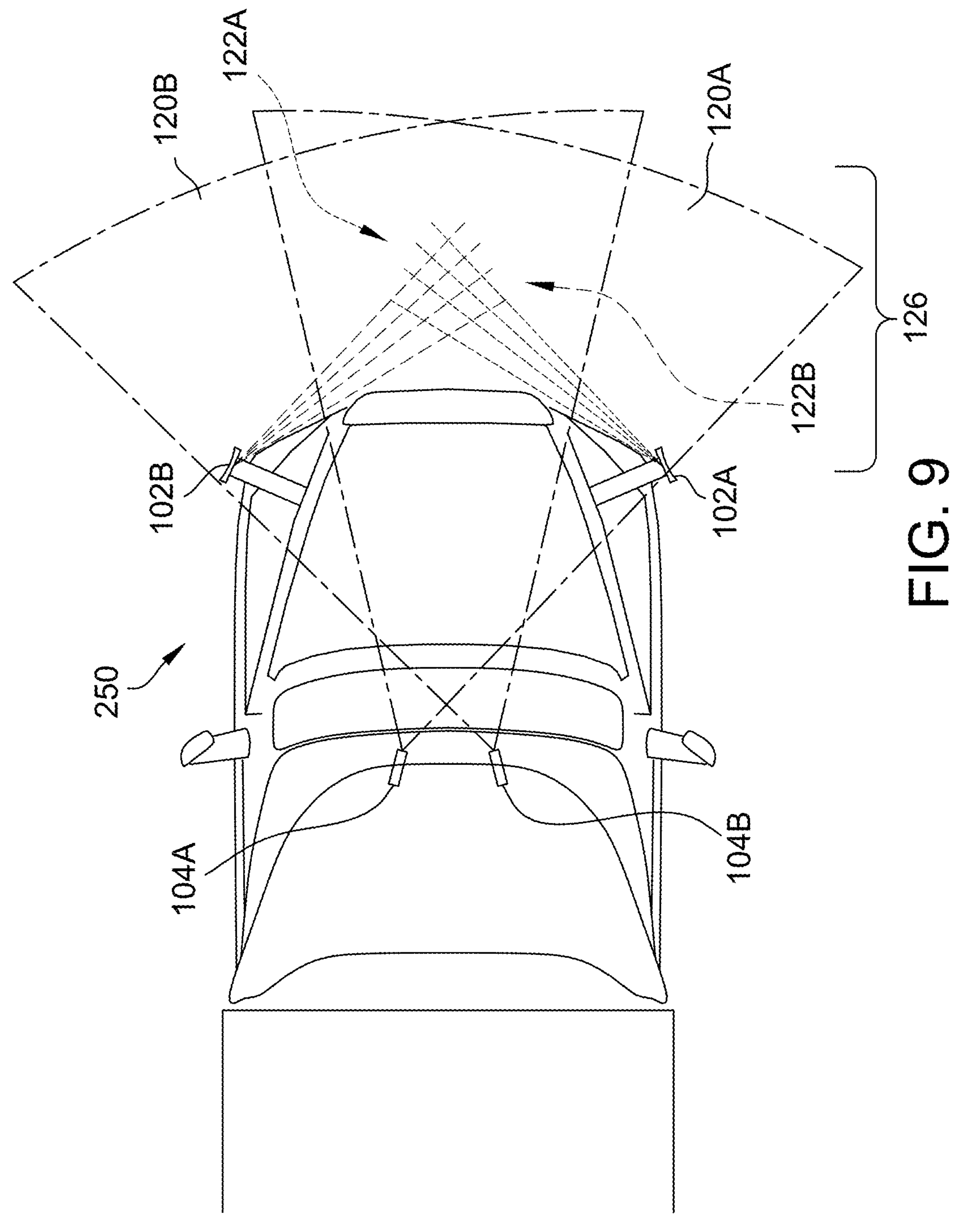
FIG. 9 is a schematic top view of the autonomous vehicle shown in FIG. 8.
Figure 10:
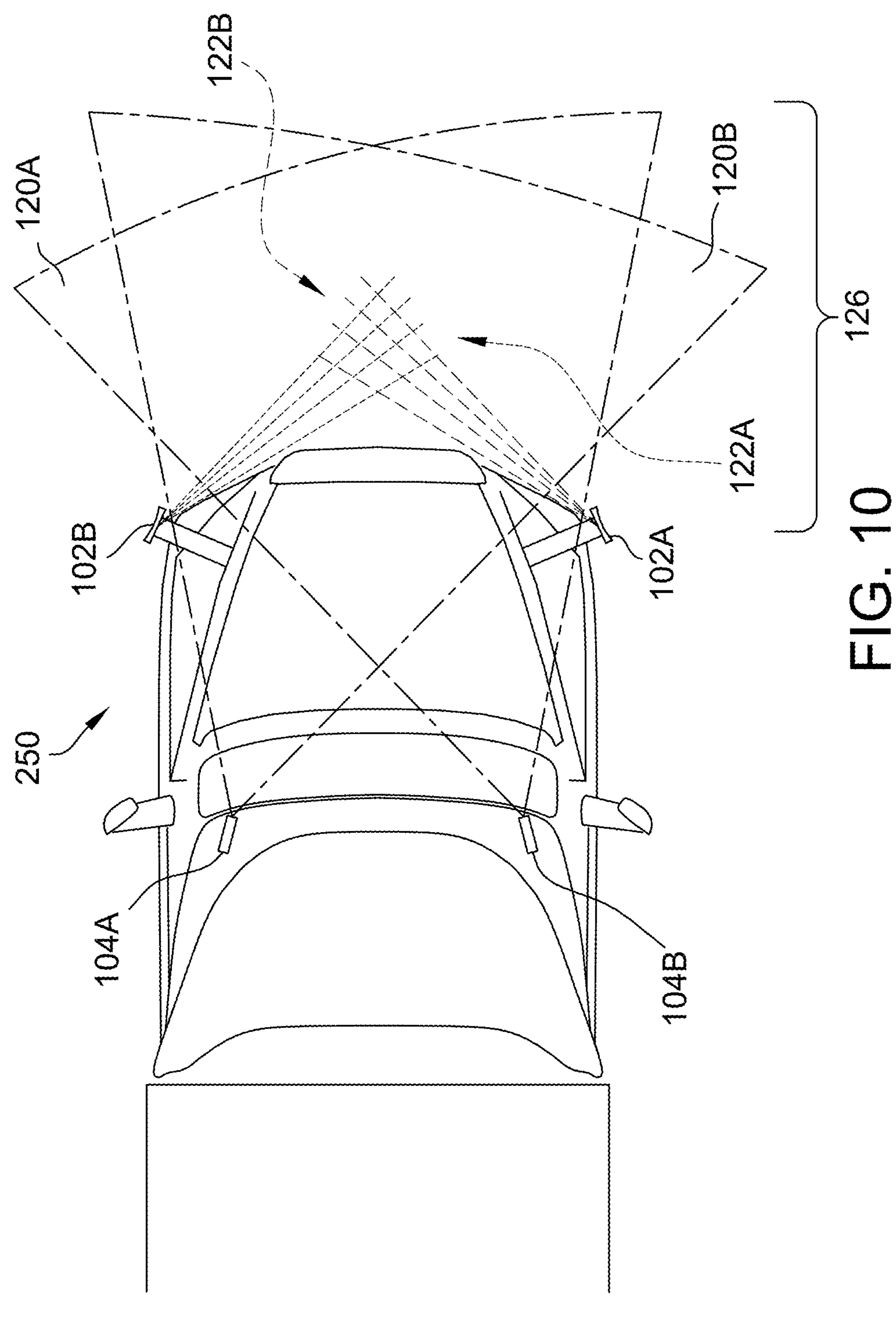
FIG. 10 is a schematic front view of an autonomous vehicle including yet another example embodiment of a blind zone visualization system.

FIG. 1 is a schematic diagram of an autonomous vehicle 100. FIG. 2 is a block diagram of autonomous vehicle 100 shown in FIG. 1. In the example embodiment, autonomous vehicle 100 includes one or more mirrors 102 coupled to a hood 106 of vehicle 100 and one or more roof-mounted sensors 104 coupled to a roof 108 of vehicle 100. In some embodiments, autonomous vehicle 100 includes two mirrors 102 positioned on either side of hood 106 (as shown in FIG. 1). In other embodiments, autonomous vehicle 100 includes one mirror 102 (as shown in FIG. 7 described later) or more than two mirrors 102 (not shown) positioned at the front of hood 106 or on the sides of hood 106. In some embodiments, autonomous vehicle 100 includes one sensor 104 (as shown in FIG. 1), and sensor 104 is coupled to roof 108 at a center thereof, or at a lateral midline 114 (see FIG. 6 described later) of autonomous vehicle 100. In other embodiments, autonomous vehicle 100 includes two sensors 104 (as shown in FIGS. 8-10 described later), and sensors 104 are arranged symmetrically on roof 108, relative to lateral midline 114 of autonomous vehicle 100. In other embodiments, autonomous vehicle 100 includes more than two sensors 104 arranged at other locations along roof 108, and sensors 104 may be symmetrically positioned or asymmetrically positioned.

Autonomous vehicle 100 also includes an autonomy computing system 200, sensors 202, a vehicle interface 204, external interfaces 206, and a visualization system 250. Autonomous vehicle 100 is surrounded by an environment 110, including a front volume of space 112 existing in front of autonomous vehicle 100. Space 112 may represent a front blind zone, for at least some known vehicles, in which visual sensors cannot capture data. Because autonomous vehicle 100 of the present disclosure includes visualization system 250, however, roof-mounted sensors 104 are configured to capture data within space 112, such that space 112 does not include a front blind zone. Other volume(s) of space (not shown) within environment 110 may also be visualized using visualization system 250, such as a "rear blind zone" or "side blind zone(s)". Visualization system 250 is shown and described herein as separate from autonomy computing system 200, and visualization system 250 may include separate processing and data storage components. Additionally or alternatively, visualization system 250 is part of autonomy computing system 200 or relies on autonomy computing system 200 (or module(s) thereof) for various computer-implemented steps described herein.

In the example embodiment, sensors 202 include roof-mounted sensors 104, and may include various sensors such as, for example, radio detection and ranging (RADAR) sensors 210, various visual sensors including (but not limited to) light detection and ranging (LiDAR) sensors 212 and cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, ultrasound, internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operation of autonomous vehicle 100.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 may be captured and represented in the LiDAR point clouds. In the example embodiment, one or more of LiDAR sensors 212 are roof-mounted (e.g., as roof-mounted sensors 104) and are employed as part of visualization system 250. LiDAR sensors 212, in some instances, have a minimum detection distance from the sensors, at or above which LiDAR sensors 212 are operable to perform data capture. A distance below the minimum detection distance is outside of the field of view (FOV) of LiDAR sensors 212. The minimum detection distance may be, for example, about 10 centimeters (cm) to about 50 cm. This minimum detection distance is readily surmounted with roof-mounted LiDAR sensors 212 of visualization system 250, as the minimum detection distance extends over only structural aspects of autonomous vehicle 100 (e.g., portions of hood 106, roof 108, a windshield, etc.). Therefore, the full detection functionality of LiDAR sensors 212 across their entire FOV is available to visualization system 250.

Cameras 214 are configured to capture images of the environment surrounding autonomous vehicle 100 in any aspect or FOV. The FOV of camera 214 may have any angle or aspect such that images of the areas ahead of, to the side, behind, above, or below autonomous vehicle 100 may be captured. In the example embodiment, one or more of cameras 214 are mounted to roof 108 (e.g., as roof-mounted sensors 104) and are employed as part of visualization system 250. In some embodiments, the image data generated by cameras 214 may be sent to visualization system 250, autonomy computing system 200, or other aspects of autonomous vehicle 100. This image data may include autonomous vehicle 100 or a generated representation of autonomous vehicle 100, in addition to environment 110 around autonomous vehicle 100, including front volume of space 112. In some embodiments, one or more systems or components of autonomy computing system 200 may overlay labels to the features depicted in the image data, such as on a raster layer or other semantic layer of a high-definition (HD) map.

Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves.

In some embodiments, the system inputs from visual sensors 202, including LiDAR sensors 212 and cameras 214, may be fused or used in combination to determine conditions (e.g., locations of other objects) around autonomous vehicle 100, particularly in front volume of space 112. In some embodiments, system inputs from RADAR sensors 210 may also be incorporated into these perception processes.

GNSS receiver 222 is positioned on autonomous vehicle 100 and may be configured to determine a location of autonomous vehicle 100, which it may embody as GNSS data, as described herein. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, and or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that control the motion of autonomous vehicle 100 (e.g., engine, throttle, steering wheel, brakes, etc.) and to receive input data from one or more sensors 202 (e.g., internal sensors).

External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, Bluetooth™, etc.). In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, autonomous vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. In the illustrated embodiment of FIG. 2, visualization system 250 includes a calibration module 230 and a perception and understanding module 236. In some embodiments, the modules of visualization system 250 are separate from but communicatively coupled to the modules of autonomy computing system 200. In some embodiments, visualization system 250 accesses the functionality of modules of autonomy computing system 200, such as calibration module 230 and perception and understanding module 236, to perform one or more processes. In either case, visualization system 250 may be referred to as "including" the referenced modules. The modules described herein may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 operates under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous. The term "online" refers to control of autonomous vehicle 100 by autonomy computing device 200, including while autonomous vehicle 100 is stationary or in motion. In the example embodiment, visualization system 250 is activated when autonomous vehicle 100 is stationary, operating at low speeds, such as below 10 miles per hours (MPH) (4.5 kilometers per hour (km/hr)) or below 5 MPH (2.5 km/hr), or stopping and starting at a particular frequency, such as a number of times per minute, per 5 minutes, etc.

Specifically, visualization system 250 is activated to capture sensor data of front volume of space 112, to determine no obstacles are in space 112 before autonomy computing system 200 (e.g., control module 240) controls autonomous vehicle 100 to travel forward into space 112. In one example embodiment, perception and understanding module 236 of visualization system receives sensor data captured by roof-mounted sensors 104, based on modified FOVs of sensors 104. Using this sensor data, perception and understanding module 236 determines whether or not an obstacle is in space 112. When an obstacle is detected in space 112, visualization system 250 transmits a corresponding signal to behaviors and planning module 238 and/or control system 240, which will restrict autonomous vehicle 100 from moving forward into space 112. When an obstacle is not detected in space 112, visualization system 250 transmits a corresponding signal to behaviors and planning module 238 and/or control system 240, which will incorporate this signal into various determinations regarding the forward movement of autonomous vehicle 100 into space 112.

Figure 3:
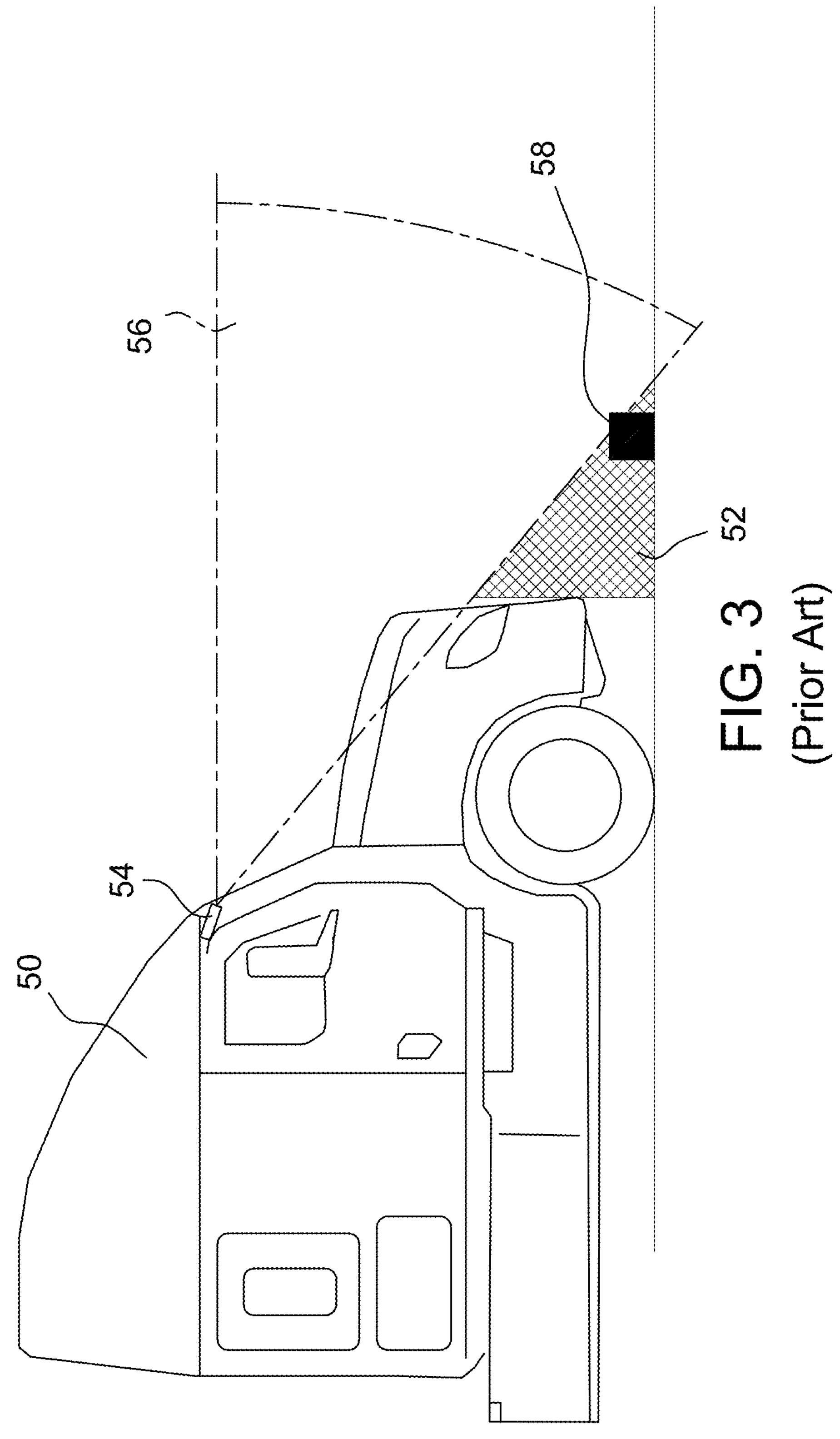
FIG. 3 is a schematic side view of a known autonomous vehicle depicting a front blind zone.

FIG. 3 is a schematic side view of a conventional autonomous vehicle 50, depicting a front blind zone 52. In this example, vehicle 50 includes at least one roof-mounted visual sensor 54. Sensor 54 has a limited FOV 56 relative to vehicle 50. In particular, FOV 56 of sensor 54 leaves front blind zone 52 in the space directly in front of vehicle 50. That is, sensor 54 does not have the vertical coverage to capture sensor data of front blind zone 52. In this example, when vehicle 50 is stationary or operating at very low speeds, sensor 54 does not detect an obstacle 58 in front of vehicle 50 within front blind zone 52.

Figure 4:
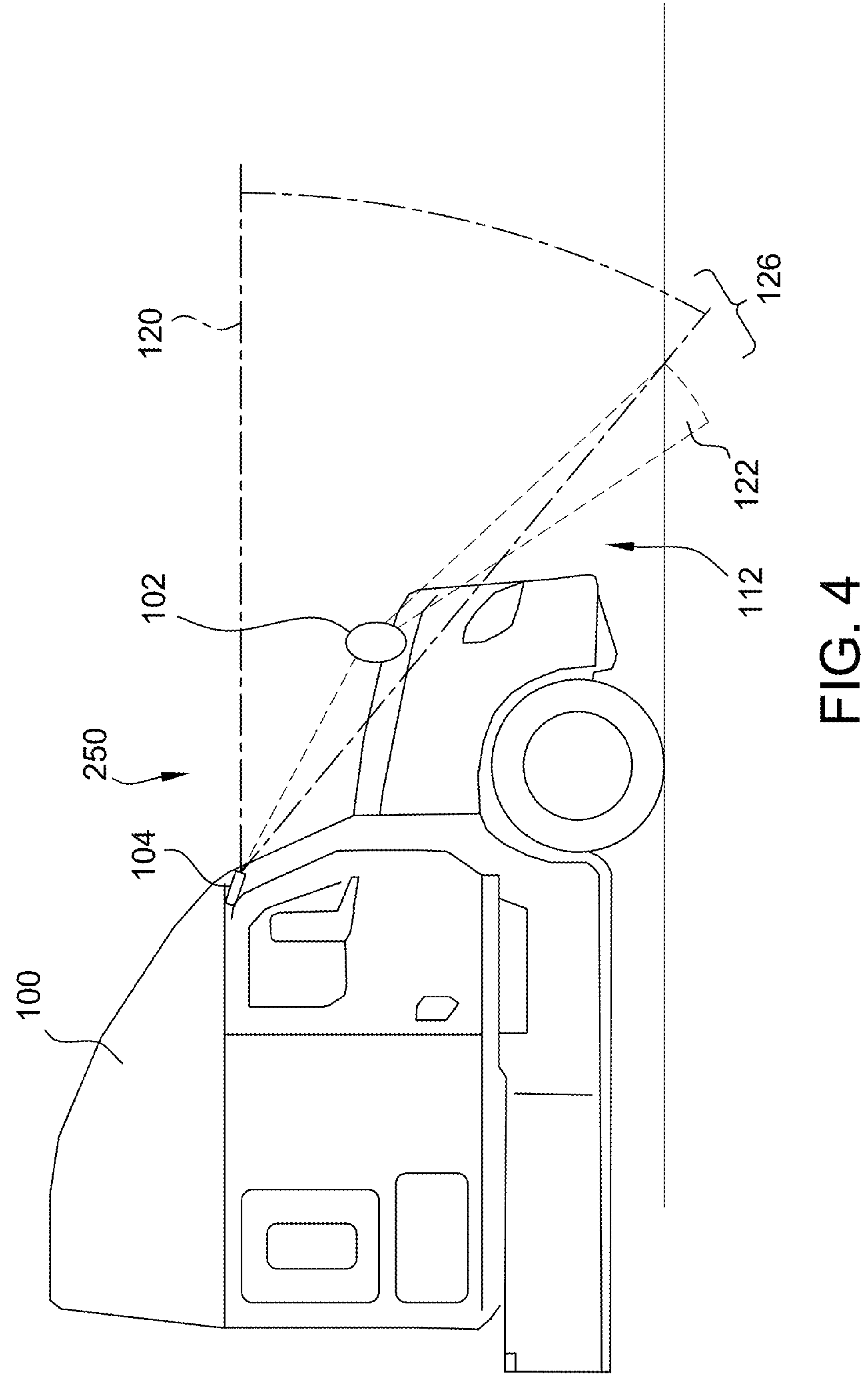
FIG. 4 is a schematic side view of an autonomous vehicle including an example embodiment of a blind zone visualization system.
Figure 5:
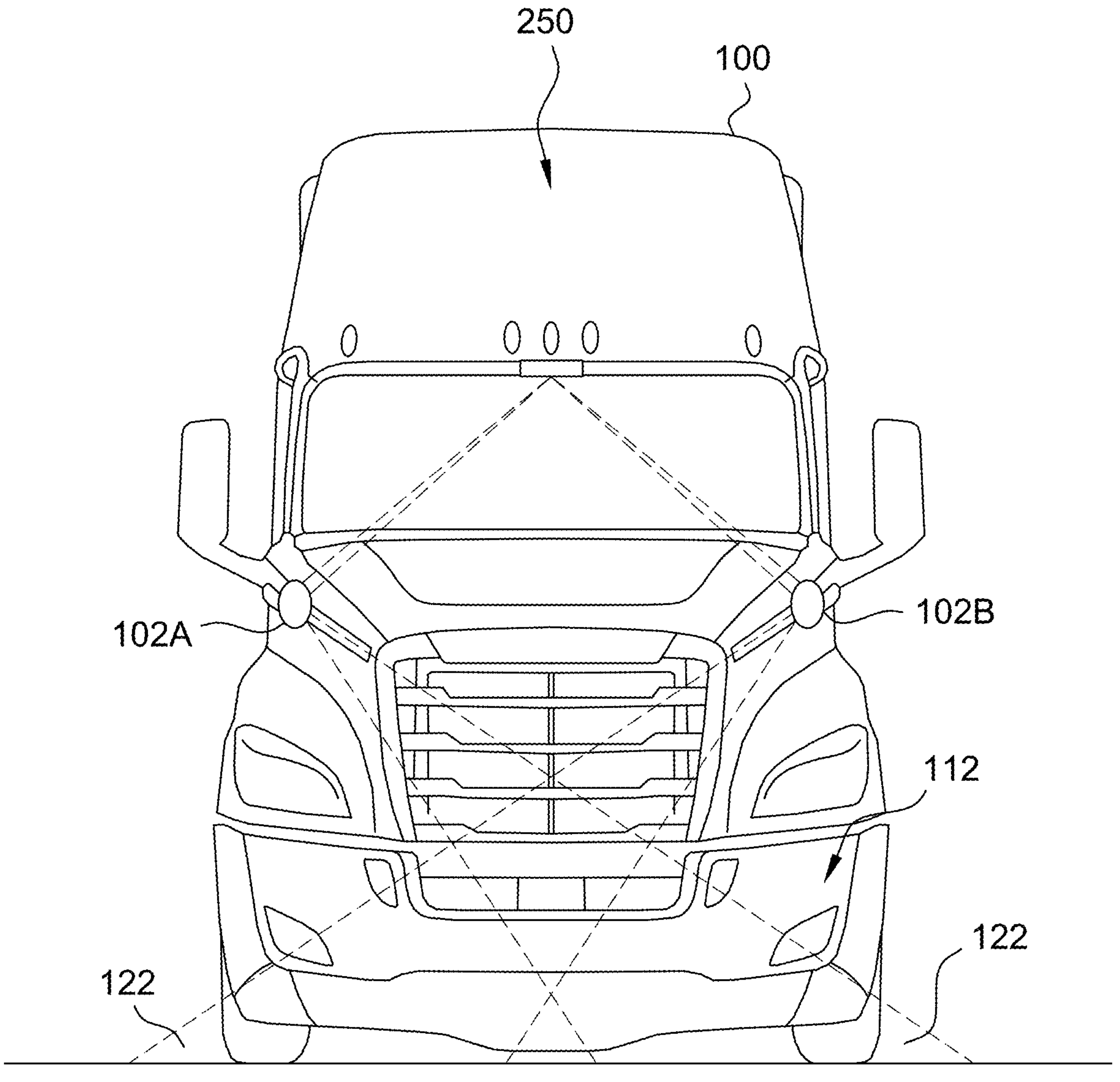
FIG. 5 is a schematic front view of the autonomous vehicle shown in FIG. 4.
Figure 6:
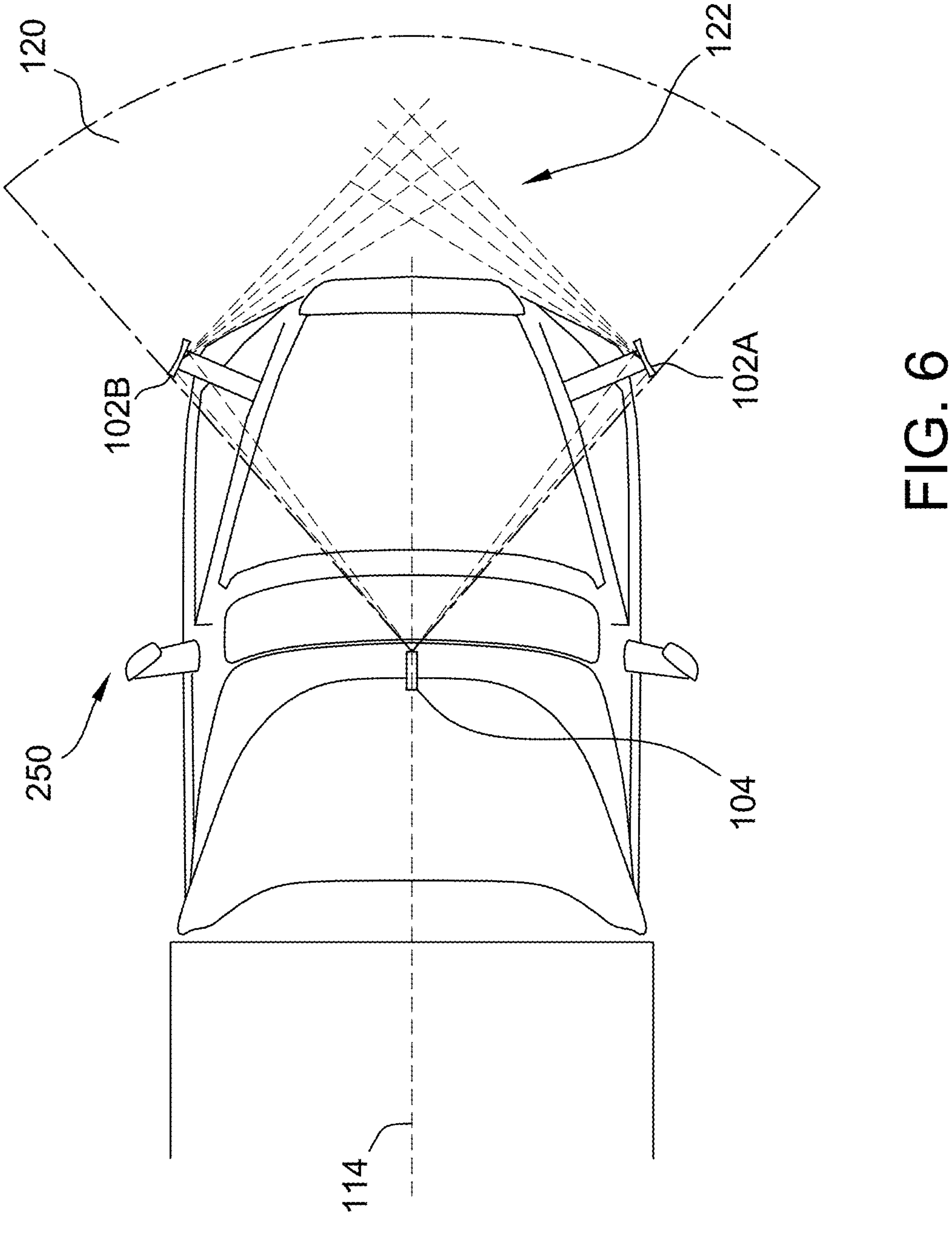
FIG. 6 is a schematic top view of the autonomous vehicle shown in FIG. 4.

FIGS. 4-6 depict autonomous vehicle 100 including a first embodiment of visualization system 250. More specifically, FIG. 4 is a schematic side view of autonomous vehicle 100, FIG. 5 is a schematic front view of autonomous vehicle 100, and FIG. 6 is a schematic top view of autonomous vehicle 100.

As described above with respect to FIG. 1, visualization system 250 includes one roof-mounted sensor 104 and a pair of hood-mounted mirrors 102, also referred to herein as mirror 102A (with reference to the one of mirrors 102 closer to the right or "passenger" side of vehicle 100) and mirror 102B (with reference to the other of mirrors 102 closer to the left or "driver" side of vehicle 100) (see FIGS. 5 and 6). Sensor 104 has a nominal, unmodified FOV 120, the boundaries of which are illustrated with a dot-dash line in FIGS. 4 and 6.

Because autonomous vehicle 100 features visualization system 250 including mirrors 102, sensor 104 has a modified FOV. Specifically, mirrors 102 redirect or redistribute a portion of unmodified FOV 120. In particular, a portion of the FOV of sensor 104 is intentionally reflected into space 112. Because light is scattered bi-directionally, when light is scattered by an obstacle (or the ground) in space 112, sensor 104 is capable of detecting the light back towards mirrors 102, and, therefore, directing back to sensor 104. Where sensor 104 is a camera, sensor 104 detects the amount of reflected light within the sensing range of the camera. Where sensor 104 is a LiDAR sensor having multi-echo detection capability, sensor 104 detects the distance difference the light travels (e.g., a different distance between sensor 104 and an obstacle or the ground). Sensor data output from sensor 104 is processed by visualization system 250 to determine whether an obstacle is present in space 112. In any of the embodiments described herein, each sensor 104 may include a single sensor, that is, one of a camera or a LiDAR sensor. Further, each sensor 104 may include a combination sensor, that is, a combined camera and LiDAR sensor.

This redirected portion of unmodified FOV 120 is referred to with reference numeral 122, and example boundaries of redirected portion 122 are illustrated with a dashed line in FIGS. 4-6. The modified FOV of autonomous vehicle 100 is referred to with reference numeral 126, and collectively includes redirected portion 122 as well as the remainder of unmodified FOV 120.

As shown in FIGS. 4 and 5, redirected portion 122 includes most if not all of space 112, such that modified FOV 126 encompasses most if not all of space 112. Specifically, redirected portion 122 includes most if not all of the vertical dimension of space 112 (as shown in FIG. 4) as well as most if not all of the horizontal dimension of space 112 (as shown in FIG. 5). Thereby, the front blind zone is reduced or eliminated.

With reference to FIG. 6, the parameters of redirection portion 122 are variable depending on parameters of mirrors 102. For example, depending on the placement, angular position, or curvature of mirrors 102, the angular divergence of redirected portion 122 will vary, as depicted by the various combinations of boundary lines defining redirected portion 122. Therefore, the amount of the horizontal spread of redirected portion 122 may be selected or calibrated relative to various characteristics of autonomous vehicle 100 and/or space 112. It is recognized that increasing the angular divergence of redirected portion 122 decreases the forward-facing range of roof-mounted sensor 104. However, because visualization system 250 is only activated under specific circumstances, such as when autonomous vehicle 100 is stationary, moving slowly, or traveling in a "stop-and-go" motion, the forward-most limits of forward-facing range are not critical to the detection of objects within space 112.

FIG. 7 is a schematic side view of autonomous vehicle 100 including another example embodiment of blind zone visualization system 250. Specifically, in this embodiment, visualization system 250 includes one roof-mounted sensor 104 and one hood-mounted mirror 102. Hood-mounted mirror 102 may be coupled to hood 106 by a singular mount 702, which may be located in a center of hood 106. Mirror 102 extends horizontally across hood 106, although the reflective surface of mirror 102 may not completely cover the entirety of mirror 102.

Sensor 104 conventionally has unmodified FOV 120. Because autonomous vehicle 100 features visualization system 250 including mirror 102, sensor 104 has a modified FOV. Specifically, mirror 102 redirects or redistributes portion 122 of unmodified FOV 120, the example boundaries of which are illustrated with a dashed line in FIG. 7. The parameters of redirected portion 122 (e.g., shape, size, angular distribution, location) are selected based on the selected parameters of mirror 102. For example, mirror 102 may have a selected curvature at two or more points thereof, to preferentially define redirected portion 122 relative to space 112.

This arrangement of a single mirror 102 may have the advantage that the reflective surface is more protected from moisture or dirt, as mirror 102 faces hood 106 and is directed partially downwards. The parameters of mirror 102, in particular the rear (non-reflective) surface, may be selected to improve aerodynamic performance or for appearance purposes.

FIGS. 8 and 9 depict a schematic front view and a schematic top view, respectively, of autonomous vehicle 100, including one more example embodiment of blind zone visualization system 250.

In this embodiment, visualization system 250 includes two roof-mounted sensors 104, also referred to as sensor 104A and sensor 104B, as well as hood-mounted mirrors 102A, 102B. Sensor 104A conventionally has a nominal, unmodified FOV 120A, and sensor 102B has a nominal, unmodified FOV 120B, the boundaries of each of which are illustrated with a dot-dash line in FIG. 9.

Mirrors 102A, 102B each redirect or redistribute a respective portion of unmodified FOV 120A, 120B. In particular, a portion of the FOV of sensor 104A is intentionally reflected into space 112 by mirror 102A located on the opposite side of autonomous vehicle 100 as sensor 104A. A portion of the FOV of sensor 104B is intentionally reflected into space 112 by mirror 102B located on the opposite side of autonomous vehicle 100 as sensor 104A. The redirected portion 122A of unmodified FOV 120A has example boundaries illustrated with a dotted line in FIGS. 8 and 9, and the redirected portion 122B of unmodified FOV 120B has example boundaries illustrated with a dashed line in FIGS. 8 and 9. The modified FOV 126 of autonomous vehicle 100 collectively includes redirected portions 122A, 122B as well as the remainder of unmodified FOVs 120A, 120B.

In the example embodiment, redirected portions 122A, 122B includes most if not all of space 112, such that modified FOV 126 encompasses most if not all of space 112. Specifically, redirected portions 122A, 122B includes most if not all of the horizontal dimension of space 112 (as shown in FIG. 8). Thereby, the front blind zone is reduced or eliminated.

With reference to FIG. 9, and as discussed above, the parameters of redirected portions 122A, 122B are variable depending on parameters of mirrors 102A, 102B. For example, depending on the placement, angular position, or curvature of mirrors 102A, 102B, the angular divergence of redirected portions 122A, 122B, respectively, will vary, as depicted by the various combinations of boundary lines defining redirected portions 122A and 122B. Therefore, the amount of the horizontal spread of these redirected portions 122A, 122B may be selected or calibrated relative to various characteristics of autonomous vehicle 100 and/or space 112.

In some embodiments, redirected portions 122A, 122B overlap, such as at lateral midline 114 (see FIG. 6) of autonomous vehicle 100. The more these redirected portions 122A, 122B overlap, the more redundancy in sensor data output from sensors 104A, 104B is provided. In other embodiments, redirected portions 122A, 122B do not significantly overlap.

FIG. 10 is a schematic top view of autonomous vehicle 100 including a further example embodiment of blind zone visualization system 250. This embodiment is similar to the embodiment of FIGS. 8 and 9, in that autonomous vehicle 100 includes two sensors 104A, 104B and two mirror 102A, 102B. However, in this embodiment, a portion of the FOV of sensor 104A is intentionally reflected into space 112 by mirror 102B located on the same side of autonomous vehicle 100 as sensor 104A. A portion of the FOV of sensor 104B is intentionally reflected into space 112 by mirror 102A located on the same side of autonomous vehicle 100 as sensor 104B. The redirected portion 122A of unmodified FOV 120A has example boundaries illustrated with dotted lines in FIG. 10, and the redirected portion 122B of unmodified FOV 120B has example boundaries illustrated with dashed lines. The modified FOV 126 of autonomous vehicle 100 collectively includes redirected portions 122A, 122B as well as the remainder of unmodified FOVs 120A, 120B.

In some embodiments, redirected portions 122A, 122B overlap, such as at lateral midline 114 (see FIG. 6) of autonomous vehicle 100. The more these redirected portions 122A, 122B overlap, the more redundancy in sensor data output from sensors 104A, 104B is provided. In other embodiments, redirected portions 122A, 122B do not significantly overlap. Additionally, the arrangement shown in FIG. 10 may facilitate mirrors 102A, 102B being oriented more inward, toward lateral midline 114 of autonomous vehicle 100. In this way, mirrors 102A, 102B may experience less obstruction due to dirt or water.

Figure 11:
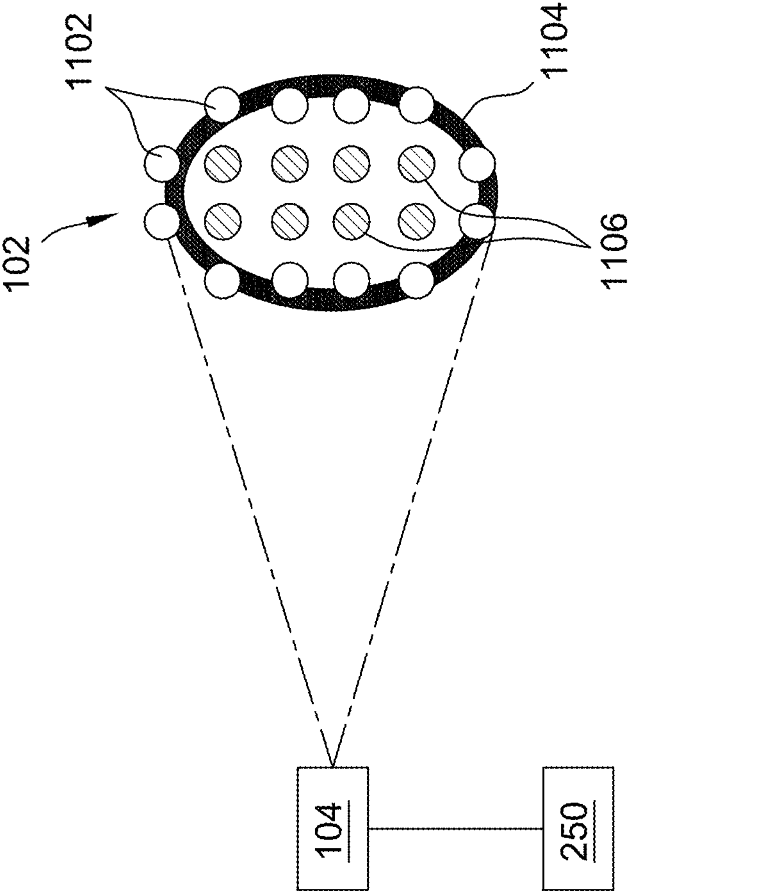
FIG. 11 is a schematic diagram illustrating an online visualization sensor calibration.

FIG. 11 is a schematic diagram illustrating an online visualization sensor calibration using visualization system 250. Specifically, visualization system 250 calibrates sensor (s) 104 based on the structure and status of mirror(s) 102 to properly interpret the sensor data from sensor(s) 104 regarding space 112. Visualization system 250 may perform a baseline measurement or determination of the status and direction of mirror(s) 102, to increase the accuracy in translating the sensor data into a representation of the space 112 in front of autonomous vehicle 100. For example, if a mirror 102 changes position (e.g., a result of an applied force) or is particularly dirty, the sensor data may be interpreted incorrectly without re-calibration.

In the example embodiment, visualization system 250 is configured to determine a position and orientation of mirror 102 by measuring calibration pixels 1102. Calibration pixels 1102 are detected as the outline or boundary of mirror 102, which may be analyzed—based on a known shape and size of mirror 102—to determine the position and orientation of mirror 102. Calibration pixels 1102 are detected or measured by sensor 104. For example, where sensor 104 is a camera, calibration pixels 1102 are readily detected as a visual boundary of mirror 102. Where sensor 104 is a LiDAR sensor, calibration pixels 1102 are detected based on difference in reflectivity. Specifically, a boundary of mirror 102 defined by a mounting structure 1104 is likely significantly less reflective than the mirrored, reflective surface of mirror 102.

Visualization system 250 is further configured to determine a current direction of the pixels 1106 representing the redirected portion of the FOV, referred to as redirected pixels 1106, for calibration of visualization system 250 as well as an assessment of the status of mirror 102. In some embodiments, sensor 104 includes a LiDAR sensor having multi-return capability is used. In response to an initial pulse, a first echo received at sensor 104 may indicate the cleanliness status of mirror 102. For example, if few or no redirected pixels 1106 are detected with the first return echo, mirror 102 may be considered clean. Visualization system 250 may analyze the distance measurements represented in the second return echo to determine or confirm an angular position of mirror 102. As another example, if all redirected pixels 1106 are detected with the first return echo, then visualization system 250 may determine mirror 102 is dirty. Additionally or alternatively, if no second return echo (e.g., from the ground) is detected, mirror 102 is likely to be too dirty for operation and needs to be cleaned. Visualization system 250 may transmit an alert to one or more other systems, the alert indicating mirror 102 is too dirty for visualization system 250 to view and interpret space 112.

Figure 12:
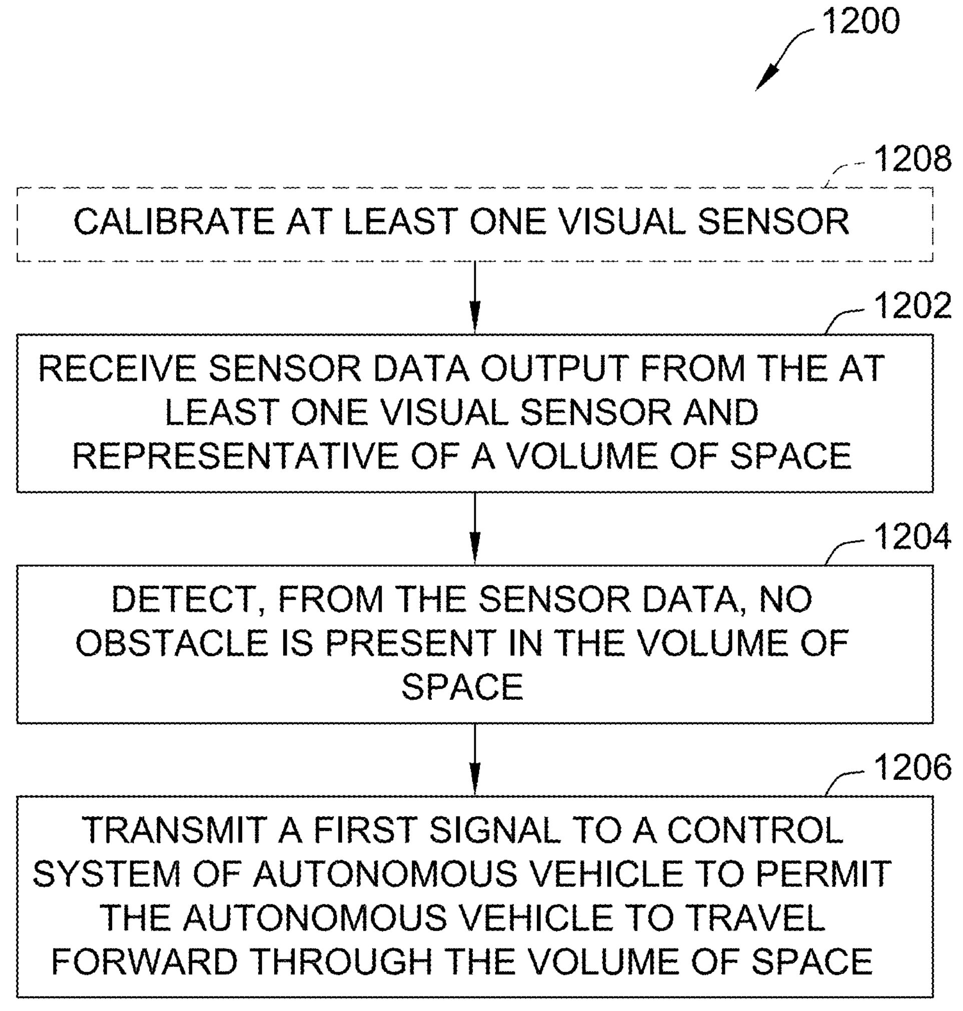
FIG. 12 is a flow diagram of a method of visualization of a volume of space in front of an autonomous vehicle.

FIG. 12 is a flow diagram of a method 1200 for viewing a volume of space in front of a stationary or slow-moving autonomous vehicle (e.g., autonomous vehicle 100, shown in FIG. 1). Method 1200 is implemented using a visualization system (e.g., visualization system 250) and/or an autonomy computing system (e.g., autonomy computing system 200, both shown in FIG. 2) on autonomous vehicle 100.

In the example embodiment, method 1200 includes receiving 1202 sensor data output from the at least one visual sensor and representative of the volume of space. Method 1200 also includes detecting 1204, from the sensor data, no obstacle is present in the volume of space. Method 1200 further includes transmitting 1206 a first signal to a control system of the autonomous vehicle to control the autonomous vehicle to travel forward through the volume of space.

Method 1200 may include additional, fewer, or alternative processes. For example, in some embodiments, method 1200 further includes calibrating 1208 the at least one visual sensor, prior to receiving 1202. Calibrating 1208 may include detecting the at least one mirror, and measuring at least one calibration pixel and at least one redirected pixel of the at least one mirror.

Figure 13:
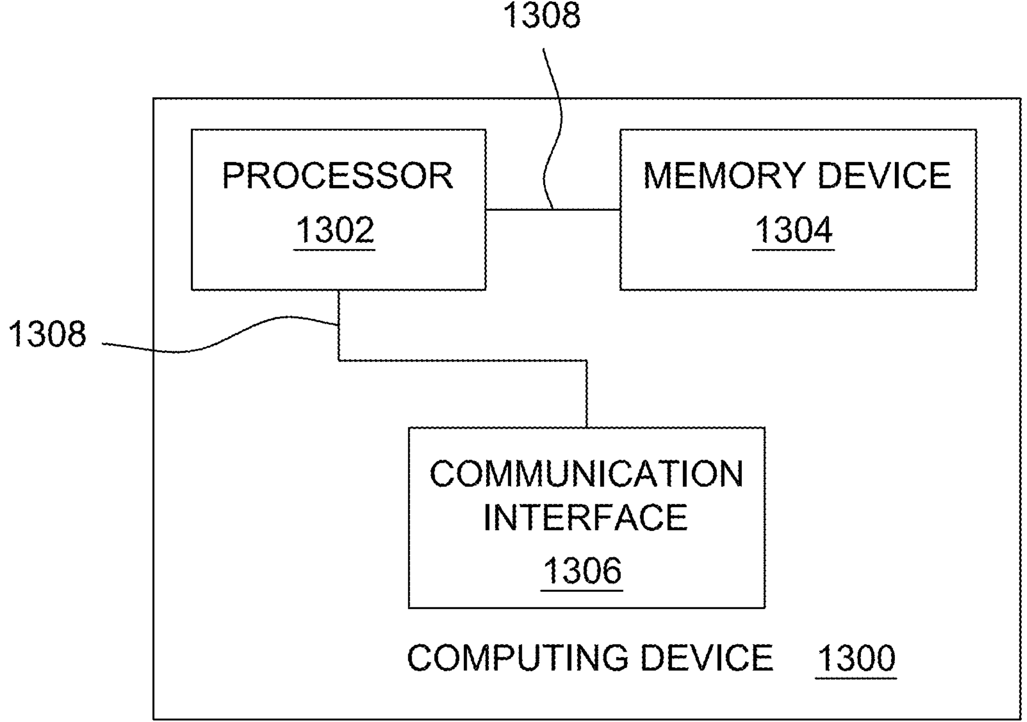
FIG. 13 is a block diagram of an example computing device.

FIG. 13 is a block diagram of an example computing device 1300. Autonomy computing device 200 and/or visualization system 250 may be implemented with one or more computing devices 1300. Computing device 1300 includes a processor 1302 and a memory device 1304. Processor 1302 is coupled to memory device 1304 via a system bus 1308. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, memory device 1304 includes one or more devices that enable information, such as executable instructions or other data (e.g., sensor data), to be stored and retrieved. Moreover, memory device 1304 includes one or more computer readable media, such as, without limitation, dynamic random-access memory (DRAM), static random-access memory (SRAM), a solid-state disk, or a hard disk. In the example embodiment, memory device 1304 stores, without limitation, application source code, application object code, configuration data, additional input events, application states, assertion statements, validation results, or any other type of data. Computing device 1300, in the example embodiment, may also include a communication interface 1306 that is coupled to processor 1302 via system bus 1308. Moreover, communication interface 1306 is communicatively coupled to data acquisition devices (e.g., sensors 202, shown in FIG. 2).

In the example embodiment, processor 1302 may be programmed by encoding an operation using one or more executable instructions and providing the executable instructions in the memory device 1304. In the example embodiment, processor 1302 is programmed to analyze measurements that are received from data acquisition devices to calibrate the autonomy computing system and to determine whether to control autonomous vehicle 100 to travel forward.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) reducing or eliminating a blind zone (including a front blind zone, rear blind zone, or side blind zone) of a stationary or slow-moving autonomous vehicle using mirrors, (b) enabling customized redirection of a sensor FOV to capture the front blind zone of vehicles having different characteristics by mounting mirrors at different locations of the autonomous vehicle or using mirrors with different parameters, and (c) facilitating these benefits without significant additional cost or complexity in the autonomy computing system.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A blind zone visualization system for an autonomous vehicle, the system comprising:

at least one visual sensor mounted on a roof of the autonomous vehicle, wherein the at least one visual sensor comprises a pair of sensors positioned on the roof at opposite sides of a lateral midline of the autonomous vehicle;

at least one mirror mounted on a hood of the autonomous vehicle, the at least one mirror configured to redirect a portion of a field of view (FOV) of the at least one visual sensor into a volume of space in front of the autonomous vehicle; and at least one processor programmed to execute computer-readable instructions that cause the at least one processor to:

receive sensor data output from the at least one visual sensor and representative of the volume of space;

detect, from the sensor data, no obstacle is present in the volume of space; and transmit a first signal to a control system of the autonomous vehicle to control the autonomous vehicle to travel forward through the volume of space.

2. The system of claim 1, wherein the computer-readable instructions further cause the at least one processor to:

detect, from the sensor data, that an obstacle is present in the volume of space; and transmit a second signal to the control system to restrict the autonomous vehicle from traveling forward into the volume of space.

3. The system of claim 1, wherein the at least one visual sensor comprises one of a camera and a LiDAR sensor.

4. The system of claim 1, wherein the at least one visual sensor comprises a combination of a camera and a LiDAR sensor.

5. The system of claim 1, wherein the at least one visual sensor further comprises a single sensor located at a center of the roof.

6. The system of claim 1, wherein the at least one mirror comprises a first mirror on one side of the hood, and a second mirror on other side of hood.

7. The system of claim 6, wherein the at least one visual sensor comprises a first visual sensor and a second visual sensor positioned on opposite sides of the lateral midline of the autonomous vehicle.

8. The system of claim 6, wherein the at least one visual sensor comprises a first visual sensor and a second visual sensor positioned on opposite sides of the lateral midline of the autonomous vehicle, the first mirror redirects a portion of the FOV of the first visual sensor into the volume of space, and the second mirror redirects a portion of the FOV of the second visual sensor into the volume of space.

9. The system of claim 1, wherein the computer-readable instructions further cause the at least one processor to:

measure, from the sensor data, at least one calibration pixel and at least one redirected pixel of the at least one mirror to detect the at least one mirror and calibrate the at least one visual sensor.

10. An autonomous vehicle comprising:

a control system; and a blind zone visualization system comprising:

at least one visual sensor mounted on a roof of the autonomous vehicle;

at least one mirror mounted on a hood of the autonomous vehicle, the at least one mirror configured to redirect a portion of a field of view (FOV) of the at least one visual sensor into a volume of space in front of the autonomous vehicle, wherein the at least one mirror comprises a first mirror on one side of the hood, and a second mirror on other side of the hood; and at least one processor programmed to execute computer-readable instructions that cause the at least one processor to:

receive sensor data output from the at least one visual sensor and representative of the volume of space;

detect, from the sensor data, no obstacle is present in the volume of space; and transmit a first signal to the control system of the autonomous vehicle to control the autonomous vehicle to travel forward through the volume of space.

11. The autonomous vehicle of claim 10, wherein the at least one visual sensor comprises one of a camera and a LiDAR sensor located at a center of the roof.

12. The autonomous vehicle of claim 10, the at least one visual sensor comprises a combination of a camera and a LiDAR sensor.

13. The autonomous vehicle of claim 10, wherein the at least one visual sensor comprises a pair of sensors positioned on opposite sides of a lateral midline of the autonomous vehicle.

14. The autonomous vehicle of claim 10, wherein the at least one visual sensor comprises a first visual sensor and a second visual sensor positioned on opposite sides of a lateral midline of the autonomous vehicle.

15. The autonomous vehicle of claim 14, wherein the first mirror redirects a portion of the FOV of the first visual sensor into the volume of space, and the second mirror redirects a portion of the FOV of the second visual sensor into the volume of space.

16. The autonomous vehicle of claim 10, wherein the at least one visual sensor comprises a single sensor located at a center of the roof.

17. A method of blind zone visualization for an autonomous vehicle, the method implemented using a visualization system including at least one visual sensor mounted on a roof of the autonomous vehicle, at least one mirror mounted on a hood of the autonomous vehicle, the at least one mirror configured to redirect a portion of a field of view (FOV) of the at least one visual sensor into a volume of space in front of the autonomous vehicle, and at least one processor programmed to execute computer-readable instructions, the method comprising:

receiving sensor data output from the at least one visual sensor and representative of the volume of space;

detecting, from the sensor data, no obstacle is present in the volume of space; and transmitting a first signal to a control system of the autonomous vehicle to control the autonomous vehicle to travel forward through the volume of space, wherein the method further comprises providing the at least one visual sensor including a pair of sensors positioned on the roof at opposite sides of a lateral midline of the autonomous vehicle.

18. The method of claim 17, further comprising:

detecting, from the sensor data, that an obstacle is present in the volume of space; and transmitting a second signal to the control system to restrict the autonomous vehicle from traveling forward into the volume of space.

19. The method of claim 17, further comprising:

calibrating the at least one visual sensor by:

detecting the at least one mirror; and measuring at least one calibration pixel and at least one redirected pixel of the at least one mirror.

* * * * *